Dec. 14, 1954
P. SPENCE
2,696,994
FLEXIBLE PIPE COUPLING
Filed Oct. 11, 1949
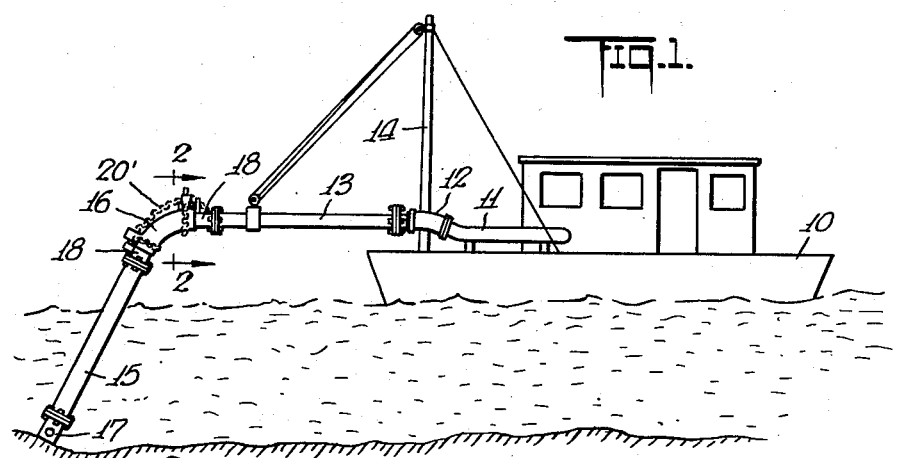
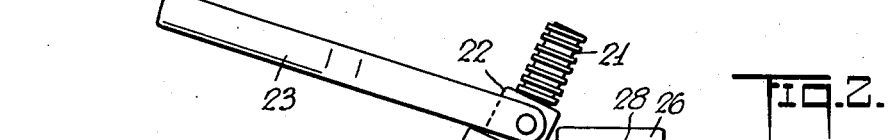
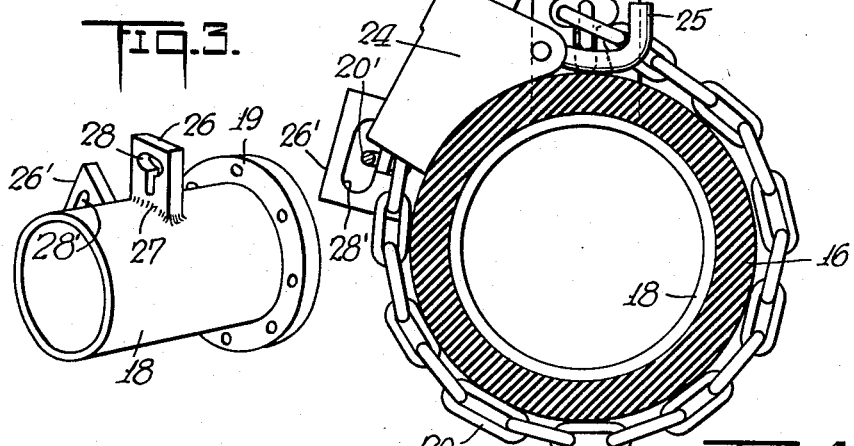
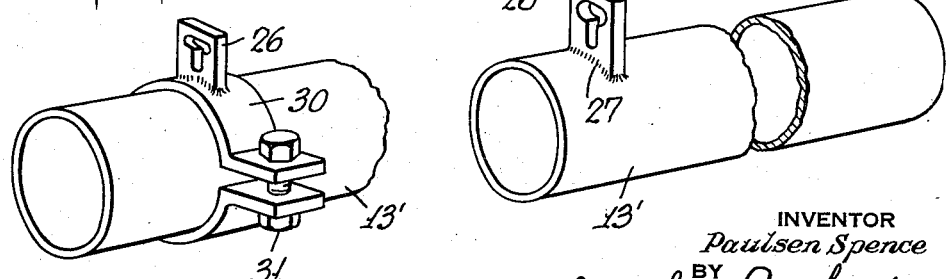
INVENTOR
*Paulsen Spence*
BY
*Mitchell Bechert*
ATTORNEYS

United States Patent Office 2,696,994
Patented Dec. 14, 1954.

2,696,994

FLEXIBLE PIPE COUPLING

Paulsen Spence, Baton Rouge, La., assignor to Spence Engineering Company, Inc., Walden, N. Y., a corporation of New York Application October 11, 1949, Serial No. 120,706

4 Claims. (Cl. 285—77)

My invention relates to an improved coupling means for flexibly connected pipes, and has particular application in dredging machinery wherein two suction pipes are to be flexibly joined.

In the operation of dredging equipment, it frequently happens that pipe lengths become separated from the flexible hoses which interconnect them. This may result in temporary loss of the hose or of the more remote length of pipe, which may also include a suction nozzle. As a result, such time is lost, not only in recovering parts, but also in reassembling the suction lines.

It is, accordingly, an object of the invention to provide improved pipe-connecting means of the character indicated.

It is another object to provide an improved means for connecting a flexible hose to a rigid pipe.

It is a further object to provide an improved means of connecting two rigid pipe lengths via a flexible hose and for preventing loss of the members should they become axially separated.

Other objects and various further features of the invention will become apparent or will occur to those skilled in the art from a reading of the following specification in conjunction with the accompanying drawings.

In said drawings, which show, for illustrative purposes only, prefered forms of the invention—

Fig. 1 is a simplified view in side elevation of a dredging barge, with suction tubing, to which coupling means in accordance with the invention have been applied;

Fig. 2 is an enlarged, sectional view through the connecting hose of Fig. 1, and taken in the plane 2—2 in order to show my clamping means;

Fig. 3 is a perspective view of a part of the clamping means of Fig. 2; and

Figs. 4 and 5 are perspective views of alternative arrangements of the part shown in Fig. 3.

Briefly stated, my invention contemplates improved means for circumferentially clamping a flexible hose against a rigid pipe over which the hose is fitted. The circumferential clamp or vise may include a length of cable or chain with a free, unsecured end. In order to prevent loss of the circumferential clamp and also to forestall axial separation of the hose from the pipe, I provide means on the pipe to which the free end of the cable or chain may be secured. In this manner, the cable or chain may serve not only for circumferential compression of the hose on the pipe, but also for axial retention of the hose and clamp with respect to the pipe. When two rigid pipes are connected to the same flexible tubing, such clamps may be applied at each overlap of the hose with the pipes, and one length of cable or chain may effectively tie one pipe to the other, so that the pipes may be retained against loss, in the event of pipe separation from one or the other end of the hose, as in the case of a broken hose.

As indicated, my invention may employ a cable or chain or the like in the clamping means. In the forms shown, a chain happens to have been employed, but it will be understood that the term cable means may be broadly descriptive of a cable or a chain, for present purposes.

Referring to Figs. 1, 2, and 3 of the drawings, I have shown my invention in application to a suction dredging equipment, which may include a centrifugal pump on a barge 10. The pump may have an inlet or suction end 11, flexibly connected at 12 to a rigid boom pipe 13. The boom may be supported by suitable rigging, as from a mast 14 on the barge 10. The suction line may further include a generally downwardly directed rigid pipe 15, connected by a flexible hose 16 to the boom 13, and a suction nozzle 17 of desired configuration may be attached, as by the flange fittings shown, to the lower end of the pipe length 15.

In accordance with the invention, I provide improved means for clamping the flexible hose 16 to the rigid pipe lengths 13—15, which are thereby flexibly joined. In the form shown, the various pipes are flanged, and the hose 16 is fitted by axially overlapping the smooth, cylindrical end of an adapter 18, as shown in Fig. 3. The adapter 18 may include a smooth, free end, to receive the hose 16, and a flanged end 19 for attachment to one of the pipe lengths 13—15.

In order securely to hold the hose 16 on the free end of the adapter 18, I employ a circumferential clamp, which may include a length of flexible cable but which in the form shown is a chain 20. The chain 20 may be attached at one end to a jack screw 21, threaded in a nut 22, and a handle 23 may be employed for setting the nut. The nut 22 may bear against a clamping body 24, and holding means such as a slotted link 25, pivoted to the clamping body 24, may receive and hold a selected chain link, depending upon the length of chain needed to surround the hose 16. It will be clear that by cranking the handle 23, the chain may be drawn into desired uniform compressional relationship with that part of the hose which overlaps the pipe adapter 18.

In accordance with the invention, I prefer that the clamping means shall include sufficient additional length of cable or chain 20 so that there may be a free and unsecured length at one end, as at the end which extends beyond the holding means 25. I employ this free length of chain 20 for axial retention of the clamping means to the pipe or pipe adapter 18, and in the form shown I rigidly mount further holding means in the form of bracket means 26 on the pipe or pipe adapter 18 to receive and hold this free length of chain.

In Fig. 3, the bracket means 26 is merely a single piece permanently welded, as at 27, to the body of the pipe or pipe adapter 18, and a generally T-shaped slot opening 28 is provided in the bracket means 26 to receive the chain and yet to hold the same, as will be clear.

I prefer that clamping means of the character described be applied at each end of the hose 16 for circumferential and axial retention of the hose 16 with respect to each of the pipes or pipe adapters 18 adjacent such ends. Also, I prefer to guard against loss of the nozzle lengths 15, as in the event of hose rupture, by positively coupling the two clamping means to each other. This desired effect may be accomplished by providing a chain 20 for one of the clamping means, with an extra long, free length 20' at one end. Such free length may not only be secured to the bracket means 26 adjacent thereto, but it may also be drawn for substantially the length of the hose 16 to be received in the notched opening 28' of further bracket means 26' on the other pipe adapter 18. Thus, a complete pipe adapter 18 may include provision for receiving two free chain ends, one of which forms part of the clamping means adjacent thereto, and the other of which is stretched from the clamping means remote therefrom.

In Fig. 4, I show an alternative structure wherein my novel clamping means may be adapted to straight cylindrical pipe having no flanged or otherwise prepared ends. In Fig. 4, the bracket means 26 is merely a single piece, welded as at 27, near one of the free ends of the pipe.

In Fig. 5, I show a further alternative arrangement wherein no welding is needed in order to adapt a straight cylindrical pipe 13' for clamping means in accordance with the invention. In Fig. 5, the bracket means 26 is welded to an adjustable clamp 30, having nut-and-bolt means 31 to secure the same by means of a circumferential belt around the pipe.

It will be appreciated that I have described a relatively simple means for very effectively clamping flexible hose to rigid pipe members by means of my novel clamps. The effectiveness of clamping and of axially retaining the hose to the pipe lengths is not only enhanced, but it is also possible to provide against loss of either of the pipe lengths, as when the hose may rupture or become axially separated from the pipe lengths.

While I have described my invention in detail for the preferred forms shown, it will be understood that modifications may be made within the scope of the invention as defined in the appended claims.

I claim:

1. In a dredging means of the character indicated, two lengths of rigid pipe joined by a flexible hose coupling fitting over the ends of both said pipe lengths, clamping means around both points of overlap of said hose with said pipe lengths, said clamping means at the point of overlap with one of said pipe lengths including a chain about said hose with a free length thereof remaining after clamping, bracket means on the other of said pipe lengths, and means on said bracket means for removably securing said free length of chain thereto.

2. In a dredging means of the character indicated, two lengths of rigid pipe, a flexible hose fitting over the adjacent ends of both lengths of rigid pipe, bracket means on each of said lengths of rigid pipe, a chain connecting the bracket means of both said lengths of pipe, said chain at one end being extended about the flexible hose at one end at the point of overlap with one length of pipe and constituting part of a clamping means to secure said hose to said last mentioned length of pipe, whereby said chain holds said lengths of pipe against separation and clamps one end of said hose to one of said lengths of pipe.

3. In the combination defined in claim 2, the other end of said chain being extended about the flexible hose at its other end at the point of overlap with the other length of pipe and constituting part of a clamping means to secure said hose to said other length of pipe, whereby said chain not only holds said lengths of pipe against separation but also clamps both ends of said hose to the respective lengths of pipe.

4. In a dredging means of the character indicated, a length of rigid pipe joined to the flexible hose coupling fitting over one end of said pipe length, clamping means including a link chain extending circumferentially and in essentially a single radial plane about the location of overlap of said hose with said pipe length, there being an excessive length of said chain, whereby after clamping there may be a free length of said chain, and chain-anchoring means rigidly carried by said pipe length adjacent said clamping means and including slotted bracket means for releasably holding said free length of chain.

References Cited in the file of this patent

UNITED STATES PATENTS

| Number | Name | Date |
|---|---|---|
| 649,916 | Dietrich | May 22, 1900 |
| 833,426 | Taube | Oct. 16, 1906 |
| 863,571 | Kintner | Aug. 13, 1907 |
| 1,220,223 | Hartman | Mar. 27, 1917 |
| 1,785,638 | Ludwig | Dec. 16, 1930 |
| 2,291,802 | Goodall | Aug. 14, 1942 |

FOREIGN PATENTS

| Number | Country | Date |
|---|---|---|
| 4,974 | Great Britain | Mar 1, 1909 |